United States Patent [19]
Fine

[11] 3,866,978
[45] Feb. 18, 1975

[54] AUXILIARY WHEEL
[76] Inventor: Maynard W. Fine, 7178 Stonebrook Rd., West Bloomfield, Mich.
[22] Filed: Apr. 17, 1973
[21] Appl. No.: 351,961

[52] U.S. Cl. ............... 301/39 T, 254/94, 301/38 R
[51] Int. Cl. ........................................... B60c 17/04
[58] Field of Search..... 301/39 R, 39 T, 38 R, 38 S, 301/40 S, 39 C, 39 CC; 254/94; 152/152

[56] References Cited
UNITED STATES PATENTS

| | | | |
|---|---|---|---|
| 2,535,567 | 12/1950 | Craig | 301/38 S |
| 2,807,507 | 9/1957 | Cook | 301/36 R |
| 3,024,070 | 3/1962 | Lardin | 301/39 R |
| 3,608,970 | 9/1971 | Strumbos | 301/38 R |

*Primary Examiner*—Lloyd L. King
*Assistant Examiner*—Reinhard J. Eisenzopf
*Attorney, Agent, or Firm*—Basile and Weintraub

[57] ABSTRACT

An auxiliary wheel for use in conjunction with a conventional pneumatic tired wheel of a vehicle when the pneumatic tire carried by the rim of the conventional wheel becomes inoperative. The auxiliary wheel has a rim member with a hard rubber tire on the outer periphery thereof and is pivotally attached to a coupling member which, in turn, is attachable to the rim of the conventional wheel. The auxiliary wheel is attached to the vehicle wheel in such a manner that upon a limited rotational movement of wheel the rim member will be moved to a position concentric with and parallel to the wheel and elevate the same to permit the vehicle to be driven without removing the inoperative tire.

10 Claims, 8 Drawing Figures

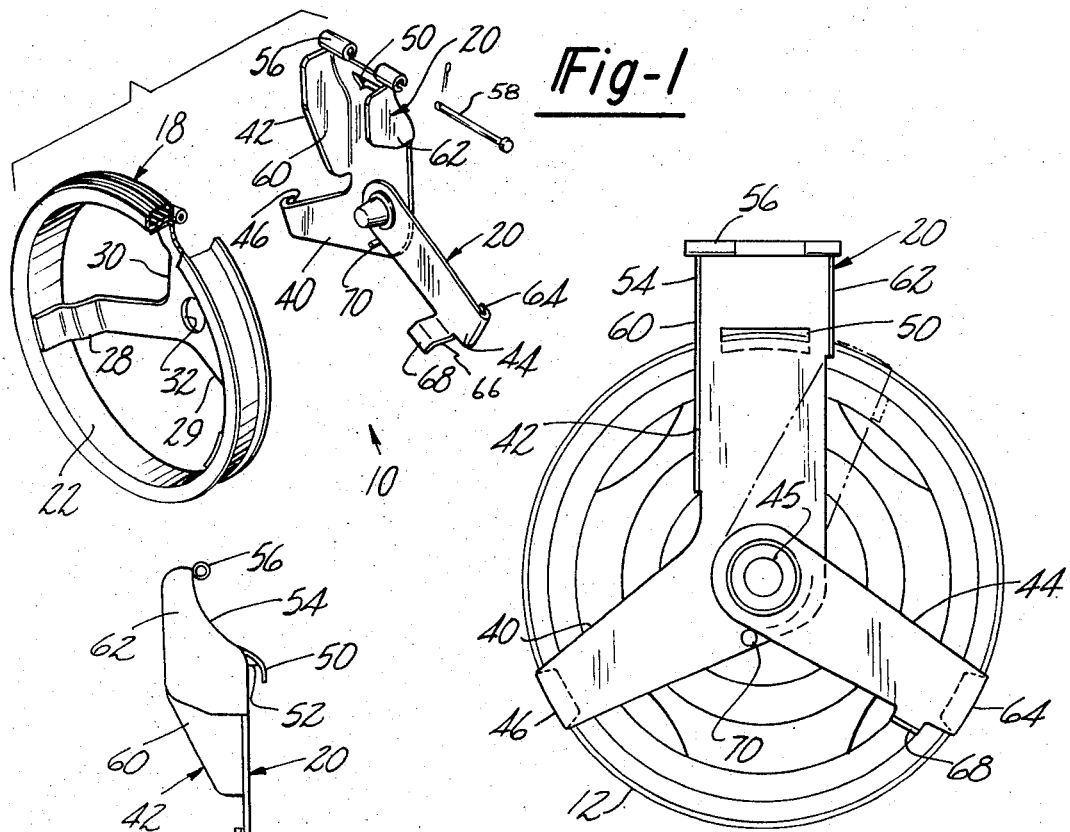
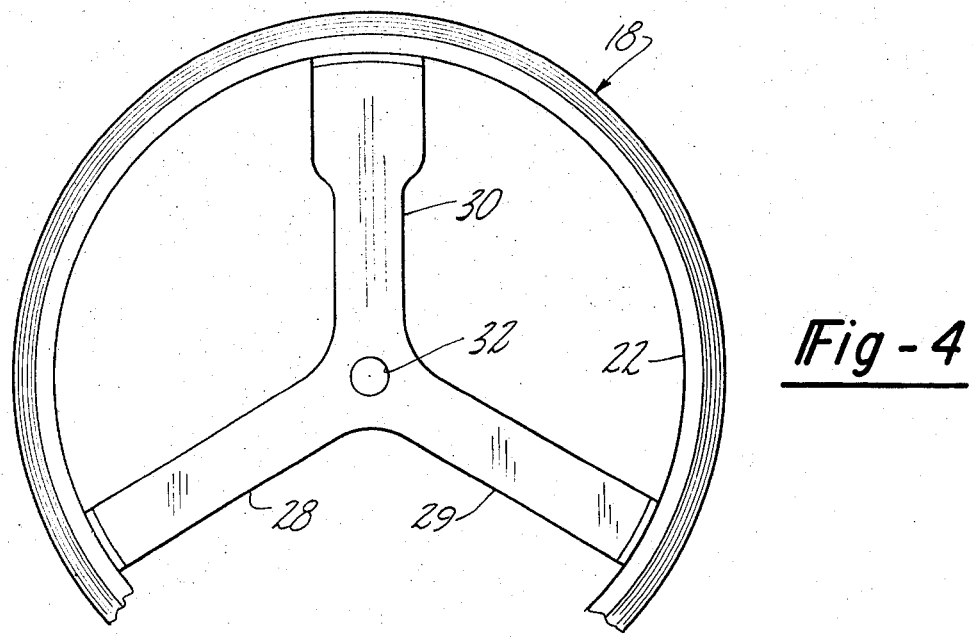

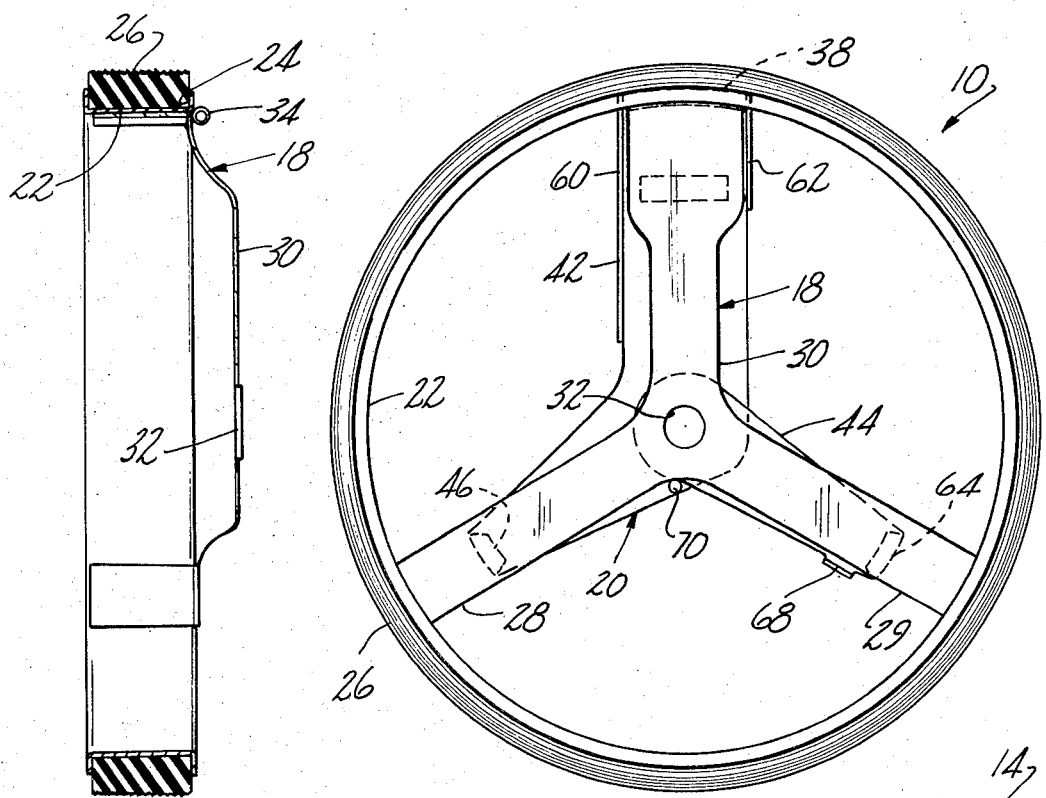
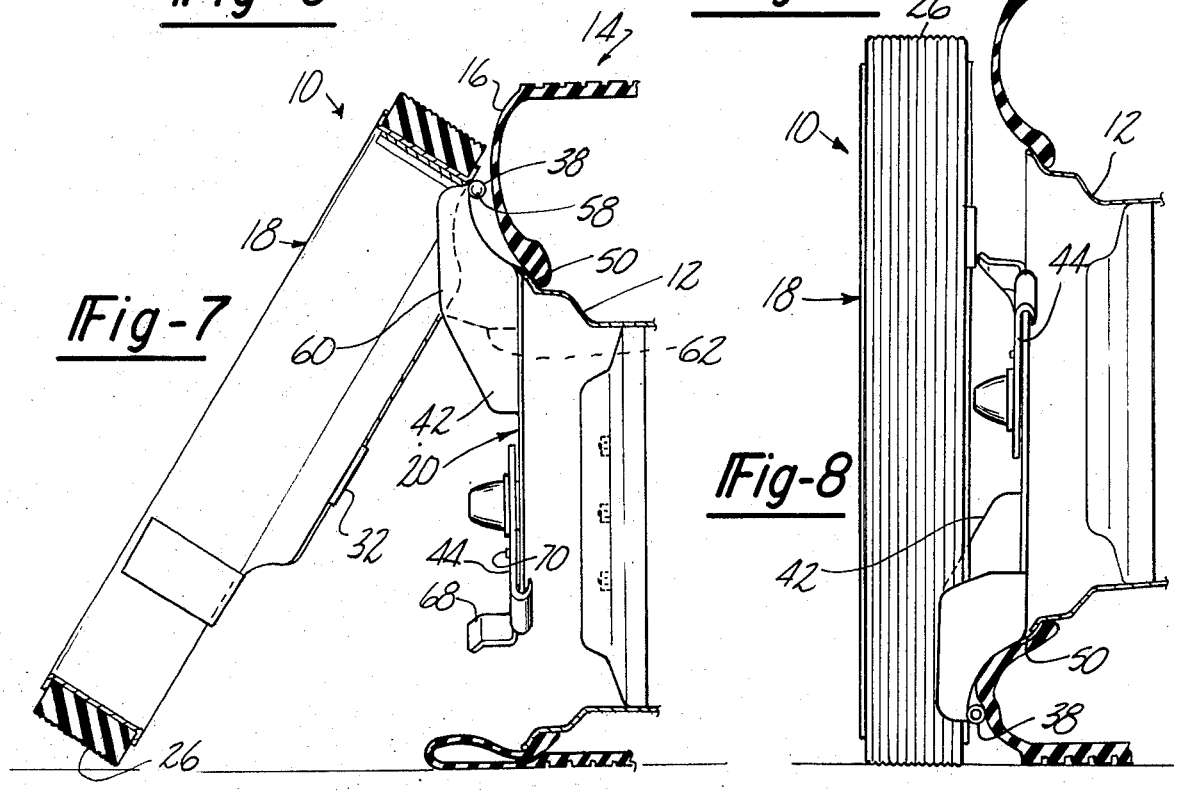

AUXILIARY WHEEL

BACKGROUND OF THE INVENTION

I. Field of the Invention

The present invention relates to an auxiliary wheel for use in conjunction with a conventional wheel of a land traversing vehicle, such as an automobile, and is normally used in emergencies when the pneumatic tire of the regular wheel becomes inoperative.

II. Description of the Prior Art

It is a common practice to provide all motor vehicles with a spare tire and the necessary equipment to facilitate the changing of a tire when one of the automobile tires becomes inoperative, such as when a tire is punctured. Although the spare tire has its drawbacks, the tire has accomplished its function in a fairly acceptable manner in the past. However, the trend today is toward the elimination of the spare tire for the obvious purpose of reducing the cost of the automobile and to eliminate the possible hazard, discomfort and time involved in the changing of a tire when the same becomes inoperative. Other objections to the use of spare tires and the associated equipment necessary for the changing of a tire includes the necessity of a substantial amount of storage space. In view of the trend to more and more compact cars, the storage space for the spare tire is becoming critical as this space is needed for the storage of more valuable or useful items, especially if the compact car is to be used on an extended trip. Thus, a prime consideration in the replacement of the spare tire is the requirement for more space and the need to eliminate the cost of the existing spare tire and accompanying equipment. Utmost in the replacement of the spare tire by a suitable substitute, all of the advantages of the spare tire must be retained, while the disadvantages are eliminated. In providing a substitute for the automobile spare tire, it is necessary to keep in mind that the intended purpose is the provision of a means for reaching a service station or other repair facility in order to have the primary vehicle pneumatic road tire repaired. The substitute should be of minimal weight, convenient in size so that it may be easily handled and one which requires a minimum amount of storage space in the vehicle.

Another important consideration of a substitute is the ease of application in using the same, as its installation should not require the change of a tire and it should eliminate the need for a jack. Further, a substitute should require only a minimum amount of manipulation so that proper use of the same may be obtained by persons of minimum strength and minimum mechanical aptitude.

Obviously, a substitute for the spare tire must be of such a design and construction that the same is dependable in that it may be used continuously and at reasonable speeds providing good handling characteristics and vehicle stability.

Heretofore, various attempts have been made at providing a suitable substitute for the automobile spare tire. Such substitutes have been disclosed in U.S. Pat. No. 2,535,567, U.S. Pat. No. 2,863,703, U.S. Pat. No. 3,608,970 and U.S. Pat. No. 3,644,001. The various designs, constructions and schemes disclosed in the aforementioned desired results, however, they are either complicated in their design, expensive to manufacture, require a separate source of air pressure in order to be usable or are outright impractical.

SUMMARY OF THE INVENTION

The present invention which will be described subsequently in greater detail, comprises an auxiliary wheel for use with a conventional pneumatic tired wheel of an automobile when the pneumatic tire carried by the rim of a conventional wheel becomes inoperative. The auxiliary wheel comprises a tire carrying rim member that is pivotally mounted to a coupling member which, in turn, is releasably attached to the disabled wheel. During initial attachment, the tire carrying rim member is disposed in an eccentric relationship with respect to the conventional wheel and during a limited rotational movement of the conventional wheel of the vehicle, the tire carrying rim member of the auxiliary wheel is snapped into a locking engagement with a coupling member so that the rim member is disposed concentrically with and parallel to the conventional wheel to elevate the same and facilitate movement of the vehicle without damage to the inoperative tire.

It is therefore a primary object of the present invention to provide an auxiliary wheel which does not require that the vehicle be jacked up or its damaged tire removed.

It is a further object of the present invention to provide an auxiliary wheel whose design utilizes the weight of the automobile to bring the auxiliary wheel into an operative position.

It is still an object of the present invention to provide an auxiliary wheel which may be easily installed without any special equipment and which is provided with means to insure that the auxiliary wheel remains attached to the automobile during transit.

It is still a further object of the present invention to provide an auxiliary wheel that offers both cost and weight savings over the conventional spare tire and which makes it possible for the designer of automobiles to increase trunk storage space by the elimination of the conventional spare tire.

It is yet a further object of the present invention to provide all the aforementioned advantages with a new and improved auxiliary wheel that is of a simple and inexpensive design and which will readily adapt itself for use on conventional wheels without any modification to the conventional wheel rim.

Other objects, advantages and applications of the present invention will become apparent to those skilled in the art of auxiliary wheels when the accompanying description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a perspective view of an auxiliary wheel constructed in accordance with the principles of the present invention;

FIG. 2 is a plan elevational view of the coupling member of the auxiliary wheel illustrated in FIG. 1 with the coupling member being shown attached to the rim of a conventional wheel;

FIG. 3 is a side elevational view of the coupling member illustrated in FIG. 2;

FIG. 4 is a fragmentary front elevational view of the rim and tire portion of the auxiliary wheel illustrated in FIG. 1;

FIG. 5 is a fragmentary cross-sectional view through the rim and tire portion of the auxiliary wheel illustrated in FIG. 1;

FIG. 6 is a front elevational view of the rim and coupling members of the auxiliary wheel with the auxiliary wheel being shown in a position concentric with and parallel to the vehicle wheel;

FIG. 7 is a fragmentary cross-sectional view of the auxiliary wheel shown attached to an inoperative pneumatic tired wheel and in a position which is eccentric with respect to the axis of rotation of the conventional wheel; and FIG. 8 is a fragmentary cross-sectional view of the auxiliary wheel shown attached to a conventional pneumatic tired wheel with the auxiliary wheel being shown in a position which is concentric with and parallel to the conventional wheel.

DESCRIPTION OF THE PREFERRED EMBODIMENT

Referring now to the drawings and, in particular, to FIGS. 1, 7 and 8 wherein there is illustrated one example of the present invention in the form of an auxiliary wheel 10 adapted to be attached to the wheel rim 12 of a vehicle wheel 14 of the type on which is mounted a conventional pneumatic tire 16. The auxiliary wheel 10 comprises a rim member 18 and a coupling member 20.

As can best be seen in FIGS. 4 and 5, the auxiliary wheel rim member 18 comprises an outer circular ring 22 on which is formed a peripheral U-shaped recess 24 that mounts a solid rubber tire 26. The rim member 18 further comprises a plurality of radially extending rim support arms 28, 29 and 30 which extend radially from the axis of the rim member 18 and terminate in a fixed attachment with the inner-periphery of the ring 22. The central portion of the rim support arms is provided with a locking aperture 32 for the purpose to be described. The rim support arm 30 is fixed to the rim on an exterior side thereof and carries an element 34 of a coupling hinge 38 (FIGS. 7 and 8). It should be noted that the rim support arms 28, 29 and 30 are at an inclined angle with respect to the common plane of the rim member 18 and tire 26. This facilitates a connection between the rim member 18 and the coupling member 20 and provides sufficient clearance between the auxiliary wheel 10 and the vehicle wheel 14 as will be described hereinafter.

Referring now to FIGS. 1, 2 and 3, wherein there is illustrated the coupling member 20 which comprises a pair of fixed, radially extending arm members 40 and 42 and a movable arm member 44 which is pivotally connected to the fixed arm members by any suitable means. In the preferred embodiment, the arm member 44 is so connected by means of a locking mechanism 45, the purpose of which will be described hereinafter. The fixed arm member 40 has an inwardly bent end 46 within which is mounted a rubber insert (not shown). The fixed arm member 42, which is arcurately spaced 120° from the fixed arm member 40, is provided with an inwardly bent portion 50 having a rubber insert 52 (FIG. 3). The fixed arm member 42 has a radially extending portion 54 that terminates in a hinge element 56. The element 56 mates with the aforementioned hinge element 34, which, in conjunction with a suitable coupling pin 58 (FIG. 7) forms the hinged coupling 38. The arm member 42 of the coupling member 20 is provided with structural support side walls 60 and 62, the side wall 62 being radially shorter than the side wall 60, so as to facilitate the positioning of the movable arm 44 in close proximity to the bent section 50 of the arm 42 as will be described hereinafter.

As can best be seen in FIG. 3, the arm 42 flares outwardly and upwardly beyond the bent portion 50, so that it is joined by the hinged coupling 38 to the auxiliary wheel rim member 18 at a sufficient distance from the wheel 14 of the vehicle to provide a proper clearance space between the auxiliary wheel and the vehicle wheel 14, all of which facilitates an easy mounting of the auxiliary wheel 10 to the vehicle wheel and which permits the auxiliary wheel 10 to function in the manner to be described hereinafter without interference with the vehicle wheel.

The movable arm member 44 of the coupling member 20 terminates in a bent end 64, however, the same is not provided with a rubber insert. The lower side edge of the movable arm member 44 (as viewed in FIG. 1) has an upwardly extending flange 66, the uppermost surface 68 of which is inclined with respect to the adjacent upper surface of the arm member 44.

As can best be seen in FIG. 2, the coupling member is utilized to attach the auxiliary wheel 10 to the disabled automobile wheel 14. This is accomplished by positioning the movable arm 44 in close proximity to the arm 42 as shown in phantom lines in FIG. 2. Initially, the fixed arms 40 and 42 are positioned on the face of the rim 12 of the automobile wheel 14, such that the bent ends 46 and 50 engage behind outer peripheral edge of the wheel rim 12 as shown in FIG. 7 and 8 of the drawings. The movable arm 44, which also has its bent edge in engagement with the peripheral edge of the wheel rim 12 is then arcurately displaced into a snug fit at the position illustrated in FIG. 2, which is approximately 120° from the fixed arm members 40 and 42. When the movable arm 44 is in the position illustrated, the coupling member 20 is fixedly but releasably secured to the vehicle rim 12 and the locking mechanism 45 is concentric with the axis of rotation of the wheel rim 12. The flange 66 of the movable arm may be utilized in order to facilitate the rotational movement of the movable arm from its initial position to its final mounting position. The fixed arm 44 is provided with a metal stop 70 which limits the amount of rotational movement of the arm 44 beyond its desired mounting position.

After the coupling member 20 has been mounted to the wheel rim 12 of the disabled vehicle wheel 14, the auxiliary wheel will be in a position illustrated in FIG. 7, that is, the coupling member 20 will be mounted to the wheel rim 12 and concentric with the axis of rotation of the wheel rim 12, while the auxiliary wheel rim member 18 is pivotally mounted by means of a hinged coupling 38 to the coupling member 20. In this position, the rim member 18 and tire 26 are disposed in a common plane having an axis of rotation which is eccentric with respect to the axis of rotation of the wheel rim 12. It should also be noted that when the auxiliary wheel is first mounted to the wheel rim 12 in the aforementioned manner, the hinged coupling 38 of the auxiliary wheel 10 will be vertically spaced above the axis of rotation of the wheel.

With the auxiliary wheel 10 in the position shown in FIG. 7, the driver of the vehicle will drive the vehicle forward to rotate the wheel 14 approximately 180° whereupon the hinged coupling 38 of the auxiliary wheel 10 will be displaced to a position which is vertically below the axis of rotation of the vehicle wheel 14. In this position, the weight of the automobile acting on the auxiliary wheel 10 will force the same to rotate about the hinged coupling 38 upwardly and toward the wheel 14, whereupon the outer surface of the locking mechanism 45 will snugly engage the aperture 32 of the rim support arms 28, 29 and 30 and lock the rim member 18 in a position wherein the same is concentric with and parallel to the vehicle wheel 14. In this position, the vehicle wheel 14 is elevated a sufficient distance to permit movement of the vehicle without damage to the wheel tire 16. It should be noted that the radial distance between the aperture 32 and the hinge coupling 38 must be equal to the radial distance between the locking mechanism 45 and the hinge coupling 38 in order for the auxiliary wheel 10 to be moved into a concentric position after rotation of the vehicle wheel.

Referring now to FIG. 6, the rim member 18 is shown in its concentric position with the coupling member 20 and the rim 12 of the vehicle wheel 14. It can be seen that the rim support arm 30 is positioned between the side walls 60 and 62 of the coupling member arm 42 such that the opposing side walls 60 and 62 provide lateral support for the rim member 18, insuring that the rim member 18 will rotate in a stable manner with respect to the vehicle wheel.

When the rim member 18 is snapped into the aforementioned vertical position, as illustrated in FIG. 8, the edge of the support arm 29 (FIG. 6) will slidably engage the inclined surface 68 of the movable arm flange 66 to insure that the movable arm 44 is in its proper location with respect to the fixed arms 40 and 42 of the coupling member 20. It should also be noted that once the rim member 18 is in the vertical position illustrated in FIG. 8, and engaging the locking mechanism 45, the movable arm 44 of the coupling mechanism is restrained from rotating back to its initial loading position 2 because of the abutment of the flange 66 with the lower edge of the rim support arm 29.

After the auxiliary wheel 10 has been attached to the inoperative wheel 14, the vehicle may be driven for a reasonable distance at reasonable speeds to a service station or the like, whereupon the auxiliary wheel may be removed and the attendant may repair the inoperative tire. Removal of the auxiliary wheel is simply facilitated by raising the inoperative wheel 14 with a conventional jack, releasing the locking mechanism 45 and pivoting the wheel rim member 18 away from coupling member 20. The movable arm 44 of the coupling member 20 is rotated to its initial load position in close proximity to the arm 42 and the entire coupling member 20 may be simply removed from the rim 12 of the wheel 18.

It can thus be seen that the present invention provides an extremely simple auxiliary wheel which is easily attachable to the regular wheel of a motor vehicle when the tire carried by the vehicle wheel is inoperative.

It can also be seen that the present invention provides a new and improved auxiliary wheel which has eliminated the shortcomings of the prior art devices and spare tires, as aforementioned.

Although only one example of the present invention has been disclosed, it should be understood that by those skilled in the art of auxiliary wheels, that other forms may be had, all coming within the spirit of the invention and scope of the appended claims.

What is claimed is as follows:

1. An auxiliary wheel for use with a conventional pneumatic tired wheel of a vehicle when the pneumatic tire carried by the rim of the conventional wheel is inoperative, said auxiliary wheel comprising;
   a circular rim member having an outer diameter greater than the rim of said conventional wheel;
   a tire carried on the outer peripheral surface of said circular rim member;
   structural support means interconnecting portions of the inner periphery of said circular rim member;
   a coupling member having attaching means for releasably attaching said member having a portion thereof arranged to extend radially beyond said attaching means;
   means pivotally connecting said extended coupling member portion to said circular rim member, said circular rim member being in a non-coaxial position with respect to said wheel rim when said coupling member is attached thereto, said rim member being movable from said non-coaxial position to a coaxial position with respect to said wheel rim when said wheel is rotated a limited distance.

2. The auxiliary wheel defined in claim 1 further comprising means carried by said rim member for engaging a portion of said releasably attaching means to prevent removal of said coupling member from said wheel rim while said rim member is in said coaxial position.

3. The auxiliary wheel as defined in claim 1 wherein said releasably attaching means comprises a support member having first and second radially extending arms with inwardly bent ends adapted to engage the peripheral surface of said wheel rim, a third arm pivotally carried by said support member and having a bent end engagable with said wheel rim when said support member is inserted on said wheel rim, said third arm being movable from said initial engaged position a limited distance to secure said support member to said wheel rim, said extending portion of said coupling member being carried by one of said other radially extending arms.

4. The auxiliary wheel defined in claim 3 further comprising means carried by one of said other arms to limit the arcuate movement of said movable third arm with respect to said other arms.

5. The auxiliary wheel defined in claim 4, wherein said structural support means comprises a plurality of arm members extending from the axis of rotation of said rim member and terminating at the inner peripheral surface of said rim member and fixed thereto, one of said arm members being aligned with said extending portion of said coupling support member when said rim member is in said coaxial position and another of said arm members of said rim member being aligned with said movable third arm when said rim is in said coaxial position, and means carried by said auxiliary wheel for preventing movement of said movable arm back to said initial position.

6. The auxiliary wheel defined in claim 5 further comprising means carried by said rim member to prevent movement of said movable arm beyond said engaged position.

7. The auxiliary wheel defined in claim 5 further comprising rubber inserts carried within the bent end of said other arms of said coupling member to restrain said coupling member from movement with respect to said vehicle rim peripheral surface.

8. The auxiliary wheel defined in claim 1, wherein said structural support means of said rim member comprises a plurality of radially disposed arm members terminating at said rim and originating from the axis of rotation of said rim member, a first of said rim arm members being aligned with said radially extending portion of said coupling member when said rim member is in said coaxial position and locking means carried by said coupling member and engaging a portion of said rim arm members to lockingly secure said rim member in said coaxial position after said vehicle wheel is rotated said limited distance.

9. The auxiliary wheel defined in claim 1, wherein said rim member and coupling member are of sufficient strength to support the weight of the vehicle on which said wheel is attached.

10. The auxiliary wheel defined in claim 8, wherein said one arm associated with said pivotable means is provided with outwardly extending side walls between which one of said arm members of said rim member is disposed when said rim member is in said coaxial position to provide lateral support of said rim member on said wheel.

* * * * *